United States Patent [19]

Kaub

[11] 4,239,296
[45] Dec. 16, 1980

[54] CONTROL VALVE ASSEMBLIES

[75] Inventor: Manfred Kaub, Rhens, Fed. Rep. of Germany

[73] Assignee: Girling Limited, Birmingham, England

[21] Appl. No.: 37,287

[22] Filed: May 9, 1979

[30] Foreign Application Priority Data

May 9, 1978 [GB] United Kingdom ............... 18550/78

[51] Int. Cl.³ .............................................. B60T 8/00
[52] U.S. Cl. ................... 303/24 A; 303/6 C;
303/24 C; 303/24 F
[58] Field of Search ................... 303/24, 6 C; 188/349

[56] References Cited

U.S. PATENT DOCUMENTS

| 3,773,362 | 11/1973 | Lewis | 303/24 C X |
| 3,790,221 | 2/1974 | Fulmer | 303/6 C |
| 4,077,673 | 3/1978 | Takeshita et al. | 303/24 F |

Primary Examiner—Douglas C. Butler
Attorney, Agent, or Firm—Scrivener, Parker, Scrivener and Clarke

[57] ABSTRACT

A control valve assembly for a vehicle braking system, comprises a valve controlling communication between an inlet and an outlet, the valve having a valve seat carried by a control piston and an inertia-responsive member, preferably a ball, movable into engagement with the valve seat to close the valve at a predetermined deceleration of the vehicle. A disabling device is provided which is operable in response to the pressure at the outlet to hold the valve open. The disabling device comprises an auxiliary piston which is biased to an inoperative position and is movable, in response to a predetermined outlet pressure, against the biasing force to hold the ball off its valve seat.

5 Claims, 2 Drawing Figures

CONTROL VALVE ASSEMBLIES

This invention relates to control valve assemblies for vehicle braking systems.

Vehicles which accommodate large variations in axle loading, such as commercial vehicles which must operate under fully-laden and unladen conditions, are often provided with a brake pressure control valve assembly which is incorporated in the vehicle brake system so that the rear brake pressure is varied in dependence on rear axle loading in the pressure line between a master cylinder and one or more rear wheel brake actuators to modify the pressure applied to the rear wheel brake actuators, as compared to the full master cylinder braking pressure applied to the front wheel brakes, in dependence upon vehicle loading.

Normally the control valve assembly is in the form of a pressure reducing or limiting valve and operates to decrease the rate of rear brake pressure increase with respect to the rate of front brake pressure increase. The degree by which the rate of increase of rear brake pressure is reduced is dependent on vehicle, or rear axle, loading such that as the axle load is increased the degree of brake pressure reduction is decreased. Conversely, as the axle load is decreased, the amount by which the rear brake pressure is reduced (relative to the front brake pressure) is increased. This prevents "over-braking" in the unladen condition, and consequently avoids the possibility of wheel-lock and subsequent skidding.

Control valve assemblies are known which comprise a valve member, usually a ball, movable in response to a predetermined vehicle deceleration to engage a valve seat and close off the valve, thereby cutting off communication between the inlet, which is in use connected to the master cylinder, and the outlet, which is in use connected to the rear wheel brakes.

The deceleration of the vehicle for a given braking pressure is dependent upon the vehicle loading and thus the pressure at which communication between the inlet and the outlet is cut off is dependent upon vehicle loading. In other words, the more the vehicle is loaded, the higher the "cut-in" pressure and the greater is the pressure passed to the rear wheel brakes.

If the front wheel brakes should fail it is desirable to transmit full braking pressure to the rear wheel brakes to at least partially compensate for loss of front wheel braking. Previous control valve assemblies have sensed the pressure in the front wheel braking circuit and in the absence of such pressure a disabling device has been actuated to retain the control valve open under all conditions and negate the pressure modulation of the valve. Such assemblies have the disadvantage that a pressure connection between the front wheel circuit and the valve assembly is required, the valve assembly usually incorporating a pressure differential piston the opposite sides of which are subjected respectively to front and rear braking pressures so that if the front circuit pressure should fail the piston moves under the pressure differential to hold the valve open and permit full braking pressure to pass to the rear wheel brakes.

The present invention aims to overcome that disadvantage and provides a control valve assembly for a vehicle braking system, comprising an inlet and an outlet, a valve controlling communication between the inlet and the outlet and having a valve seat carried by a control piston and an inertia responsive member movable into engagement with the valve seat to close the valve at a predetermined deceleration in use upon a vehicle, and a disabling means operable in response to pressure at the outlet to hold the valve open.

Preferably, the disabling means comprises an auxiliary differential area piston movable, in response to a predetermined outlet pressure, against a resilient biasing force to hold the inertia responsive member off its seat.

The auxiliary piston preferably supports a disabling member which is engageable with the inertia-responsive member to hold the valve open.

Two forms of control valve assembly in accordance with the invention for a vehicle braking system will now be described, by way of example, with reference to the accompanying drawings, in which.

Figure 1:
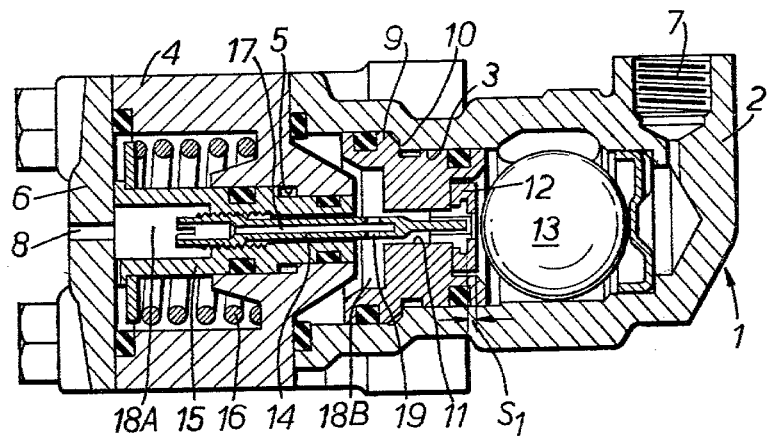
FIG. 1 is an axial cross section of one form of assembly.

Each form of assembly comprises a housing 1 having a main part 2 having a stepped bore 3, an intermediate part 4 having a stepped bore 5 and an end plate 6. An inlet 7 is formed in one end of the main part 2 and an outlet 8 is formed in the end plate 6. When the assembly is mounted on a vehicle, the inlet 7 and outlet 8 are connected respectively to a master cylinder and to the rear wheel brakes.

Sealingly slidable in the stepped bore 3 is a stepped piston 9 which in the illustrated inoperative condition engages a shoulder 10 of the bore 3. The piston 9 has an axial passageway 11 therethrough. One end of the passageway 11 is surrounded by an annular valve seat 12 and a ball 13, which constitutes an inertia-responsive valve closure member, is movable into engagement with the valve seat 12 to close off communication between the inlet 7 and the outlet 8.

An auxiliary stepped piston 15 is sealingly slidable in the bore 5 and is biased into engagement with the end plate 6 by a coil compression control spring 16. The piston 15 has a through bore into which an elongate rod 14 extends, the piston 15 supporting the rod. The rod 14 extends into the passageway 11 of piston 9.

In the form of assembly of FIG. 1, the rod 14 is spaced a distance $S_1$ from the end of the valve seat 12 and has a bore 17 which communicates an outlet chamber 18A with an intermediate chamber 18B through one or more radial openings 19. In the form of assembly of FIG. 2, the rod 14 extends beyond the end of passageway 11 and has a bore 17 which extends the entire length of the rod and a longitudinal slit 20 which interconnects the chambers 18A and 18B.

Operation of the valve assembly of FIG. 1 will now be described. When the brakes are applied, fluid pressure at inlet 7 is increased and is passed to the outlet 8 and from there to the rear brakes.

At a predetermined deceleration the ball 13 engages its seat 12 and closes the valve to prevent further increase of outlet pressure. The inlet pressure further increases and the piston 9 moves away from the shoulder 10 when the inlet pressure force acting on the smaller area of piston 9 overcomes the opposed outlet pressure force acting on the larger area of piston 9 and the ball 13 is dislodged from its valve seat by the rod 14, thereby opening the valve. The outlet pressure is thus increased, the piston 9 returns into engagement with shoulder 10 and the valve is again closed since the vehicle is still decelerating. This operation is repeated to effectively increase the outlet pressure at a reduced rate as compared to the inlet pressure.

When the piston 9 moves away from the shoulder 10, the outlet pressure increases due to the reducing volume of chamber 18B and the increased pressure acting on auxiliary piston 15 may be sufficient to overcome the biasing force of control spring 16 and move the piston 15 away from the end plate 6. This movement urges the rod 14 towards the ball 13, thereby assisting in the opening of the valve.

It will be appreciated that the predetermined deceleration at which the valve closes will be achieved at a lower braking (inlet) pressure when the vehicle is unladen than when it is fully laden so that the pressure passed to the rear brakes is dependent upon vehicle loading.

When the vehicle is fully laden, before the predetermined deceleration is reached the inlet pressure attains a value which is sufficient to move the auxiliary piston 15 against the bias of control spring 16 and thereby move the rod 14 beyond the end of passageway 11 to prevent the ball 13 closing the valve. The differential areas of piston 15, the force of control spring 16 and the distance $S_1$ are all chosen to ensure that full braking pressure is applied to the rear wheel brakes in the fully laden case. It is desirable that the distance $S_1$ is equal to or less than the "system stiffness" of the brake system as a whole, that is the elastic characteristics of all the pipework, valve bodies, brake drums etc. If $S_1$ were greater than the system stiffness the valve might not attain its metering condition.

Figure 2:
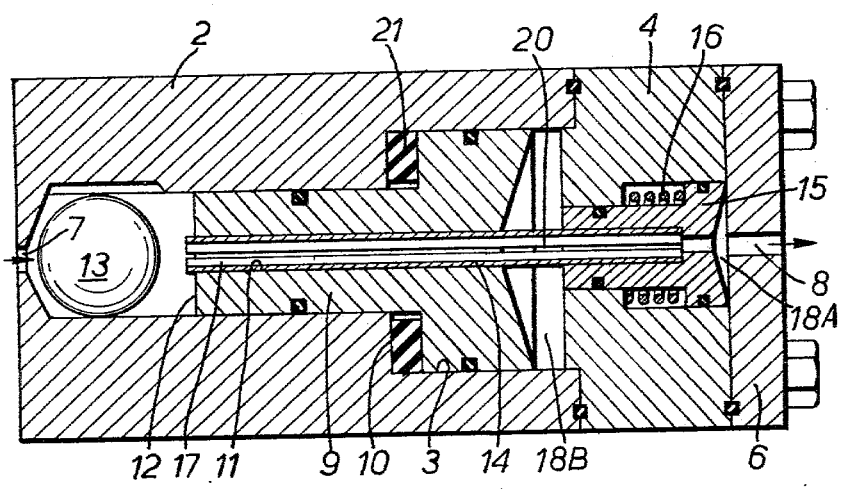
FIG. 2 is an axial cross-section of another form of assembly.

Referring now to FIG. 2, the main difference between the assemblies of FIGS. 1 and 2 is that a progressive spring 21 in the form of an annulus of elastomeric material, is located between the piston 9 and the shoulder 10 in the assembly of FIG. 2.

Operation of the valve assembly of FIG. 2 will now be described.

When the vehicle is unladen, the predetermined deceleration value at which the ball 13 moves into engagement with the seat 12 is reached at a relatively low pressure. This pressure acting over the annular area difference of the stepped diameter piston 9 urges that piston leftwardly, compressing the spring 21 against the shoulder 10.

Since the spring 21 provides a preload of predetermined magnitude which the unladen deceleration pressure valve is insufficient to overcome, the stepped piston 15 and rod 14 do not move. Thus the left-hand end of the piston 9 passes beyond the rod 14 thereby permitting engagement of the valve seat 12 by the ball 13 when the predetermined deceleration pressure is reached.

As the inlet pressure is increased after the ball valve has closed the increased pressure force acting over the smaller area of piston 9 and the force stored in compressed spring 21 tend to return the piston 9 towards its illustrated rest position.

At this stage the valve 13 remains closed and the rear brake pressure is increased at a reduced rate which is dependent on the ratio of the areas of the stepped diameter piston 9, and is also influenced by the rear brake system stiffness.

As the brake inlet pressure increases still further the effect of the spring 21 becomes negligible, since its compression has been relieved by rightward movement of the piston 9. When the piston 9 passes the end of the rod 14 the valve opens. The piston 9 then moves leftwardly again to engage the seat 12 with the ball 13 after which the cycle recommences so that the valve meters pressure fluid to the outlet.

If inlet pressure increase is continued towards its finite limit the resultant outlet pressure will eventually overcome the preload of spring 16 thereby urging piston 15 and rod 14 leftwardly, consequently disabling the valve. At this point the controlling function of the valve is negated and outlet pressure becomes equal to inlet pressure. However, the pressure levels to achieve this action would not be reached during normal braking conditions.

As the vehicle load increases, the pressure required to achieve the deceleration level at which the valve closes progressively increases with the result that the cut-off point, at which the valve assembly commences rear brake pressure metering or modulation, occurs at a higher inlet pressure.

It will be observed that as the condition changes progressively from unladen to fully-laden the inlet pressure levels increase, and as described above, the cut-off point pressures also increase, since the deceleration pressure valve increases with vehicle load, the laden vehicle requiring increased brake torque to achieve the predetermined deceleration level at which the valve commences its operation. The prevailing pressure loads acting on the area differential of piston 9 are greater and consequently the degree of compression of the progressive spring 21 is greater. However, when the piston 9 moves to the right the pressure rise resulting from pressure fluid displacement from chamber 18B causes the piston 15 to move in opposition to the displacing action of piston 9, the preload in spring 16 being overcome at a point which occurs sooner, with the higher outlet pressure, than in the unladen case.

Once the valve enters its metering phase the rate of rear brake pressure increase is governed solely by the area ratio of the stepped diameter piston 9. During the non-metering phase, the resilience of spring 21 and the rear brake system stiffness affect the modulation of the rear brake pressure.

Many modifications of the above-described assemblies are possible. For example, the valve housing parts 2 and 4 could be formed in one piece, in which case the bore 5 in which the auxiliary piston slides is formed in an insert fixed within the housing. Furthermore, the control piston 9 could be biased by a spring in a manner similar to the control piston of FIG. 2. The spring 21 need not be an elastomeric annulus, but may, for example, be a stack of Belleville washers. Although shown in the end plate 6, the outlet opening may open into chamber 18B.

It will be appreciated that in both forms of assembly described above, the auxiliary piston 15 will disable the valve in the event of front brake pressure failure to ensure full braking pressure is passed to the rear wheel brakes. If the front brakes are inoperative due to pressure failure, the braking pressure at which the predetermined deceleration occurs is relatively high and is sufficient to move the piston 15 against the bias of control spring 16 to thereby hold the ball away from the valve seat. No additional means for sensing front brake pressure are required.

Although described above as pressure reducing or metering valves, the valves could be designed as pressure limiting valves.

I claim:

1. A control valve assembly for a vehicle braking system, comprising a housing having an inlet and an outlet, and a bore between said inlet and outlet, a valve controlling communication between said inlet and said outlet, a control piston movable in said bore, said valve having a valve seat carried by said control piston and an inertiaresponsive member movable into engagement with said valve seat to close said valve at a predetermined deceleration of the vehicle, and disabling means operable in response to the pressure at said outlet to hold said valve open, said disabling means comprising an auxiliary piston, a rod connected to said auxiliary piston, and resilient means biasing said auxiliary piston to an inoperative position, said auxiliary piston having stepped opposed faces subjected to outlet pressure and being movable, in response to a predetermined outlet pressure, against the force of the resilient means to cause said rod to hold said inertia-responsive member off said valve seat, said rod having therein a passageway which at all times permits the passage of fluid between chambers located on opposite sides of said auxiliary piston.

2. A control valve assembly according to claim 1, wherein said rod extends through said control piston.

3. A control valve assembly according to claim 1, wherein said control piston is a stepped piston subjected on its larger face to the outlet pressure and on its smaller face, when the valve is closed, to inlet pressure.

4. A control valve assembly according to claim 1 including resilient means biasing said control piston in a direction to open said valve.

5. A control valve assembly according to claim 4, wherein said housing and said control piston have facing shoulders, and wherein said resilient means is an annulus of elastomeric material located between said facing shoulders.

* * * * *